United States Patent
Pacella

(10) Patent No.: US 10,442,324 B2
(45) Date of Patent: Oct. 15, 2019

(54) CHILD SAFETY SEAT

(71) Applicant: Wonderland Switzerland AG, Steinhausen (CH)

(72) Inventor: Jonathan M. Pacella, Coatesville, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 42 days.

(21) Appl. No.: 15/648,789

(22) Filed: Jul. 13, 2017

(65) Prior Publication Data
US 2018/0015848 A1    Jan. 18, 2018

Related U.S. Application Data

(60) Provisional application No. 62/362,740, filed on Jul. 15, 2016.

(51) Int. Cl.
*B60N 2/28*    (2006.01)

(52) U.S. Cl.
CPC ......... *B60N 2/2821* (2013.01); *B60N 2/2803* (2013.01); *B60N 2/2845* (2013.01); *B60N 2/2863* (2013.01); *B60N 2/2875* (2013.01)

(58) Field of Classification Search
CPC .. B60N 2/2821; B60N 2/2803; B60N 2/2845; B60N 2/2863; B60N 2/2875
USPC ............... 297/256.16, 256.15, 256.13, 250.1
See application file for complete search history.

(56) References Cited

U.S. PATENT DOCUMENTS

| | | | | |
|---|---|---|---|---|
| 5,505,519 A * | 4/1996 | Natt | .......................... | B60N 2/28 297/250.1 |
| 5,746,478 A * | 5/1998 | Lumley | ................ | B60N 2/2875 297/250.1 |
| 5,775,771 A * | 7/1998 | La Cour | .............. | B60N 2/3084 297/188.04 |
| 5,997,086 A * | 12/1999 | Gibson | ................ | B60N 2/2821 297/130 |
| 6,315,359 B1 * | 11/2001 | Wetter | ................ | B60N 2/2821 297/250.1 |
| 6,554,358 B2 * | 4/2003 | Kain | .................... | B60N 2/2806 297/256.13 |
| 6,773,065 B1 * | 8/2004 | Stamper | ................. | A47D 5/006 297/250.1 |
| 7,901,003 B2 * | 3/2011 | Meeker | ................ | B60N 2/2806 297/250.1 |
| 8,596,718 B2 * | 12/2013 | Gaudreau, Jr. | ...... | B60N 2/2821 297/188.09 |

(Continued)

*Primary Examiner* — Syed A Islam
(74) *Attorney, Agent, or Firm* — NZ Carr Law Office, PLLC

(57) ABSTRACT

A child safety seat includes a child seat for receiving a child, and a support base for supporting the child seat, the child seat being detachably installable on the support base. The support base includes a shell body having an end and a bottom surface, and an extension part disposed adjacent to the end of the shell body and having a foremost end surface. The child safety seat is positionable on a vehicle seat with the foremost end surface in contact with a seatback of the vehicle seat, the extension part being movable relative to the shell body substantially parallel to the bottom surface between a first and a second position, the foremost end surface being adjacent to the end of the shell body in the first position and deployed away from the end of the shell body in the second position.

19 Claims, 16 Drawing Sheets

(56) References Cited

U.S. PATENT DOCUMENTS

| | | | | |
|---|---|---|---|---|
| 8,899,678 | B2* | 12/2014 | Doolan | B60N 3/101 |
| | | | | 297/256.13 |
| 9,771,007 | B2* | 9/2017 | Shellenberger | B60N 2/2863 |
| 2003/0155797 | A1* | 8/2003 | Amirault | B60N 2/2851 |
| | | | | 297/250.1 |
| 2004/0232747 | A1* | 11/2004 | Yamazaki | B60N 2/2806 |
| | | | | 297/250.1 |
| 2007/0080567 | A1* | 4/2007 | Konig | B60N 2/2875 |
| | | | | 297/250.1 |
| 2014/0252827 | A1* | 9/2014 | Taylor | B60N 2/2875 |
| | | | | 297/256.13 |
| 2014/0300155 | A1* | 10/2014 | Lehman | B60N 2/2821 |
| | | | | 297/256.16 |
| 2016/0114706 | A1* | 4/2016 | Hutchinson | B60N 2/2821 |
| | | | | 297/256.13 |
| 2016/0200225 | A1* | 7/2016 | Van Der Veer | B60N 2/2812 |
| | | | | 297/256.16 |
| 2016/0280100 | A1* | 9/2016 | Scheppegrell | B60N 2/90 |
| 2017/0341541 | A1* | 11/2017 | Wuerstl | B60N 2/2845 |

* cited by examiner

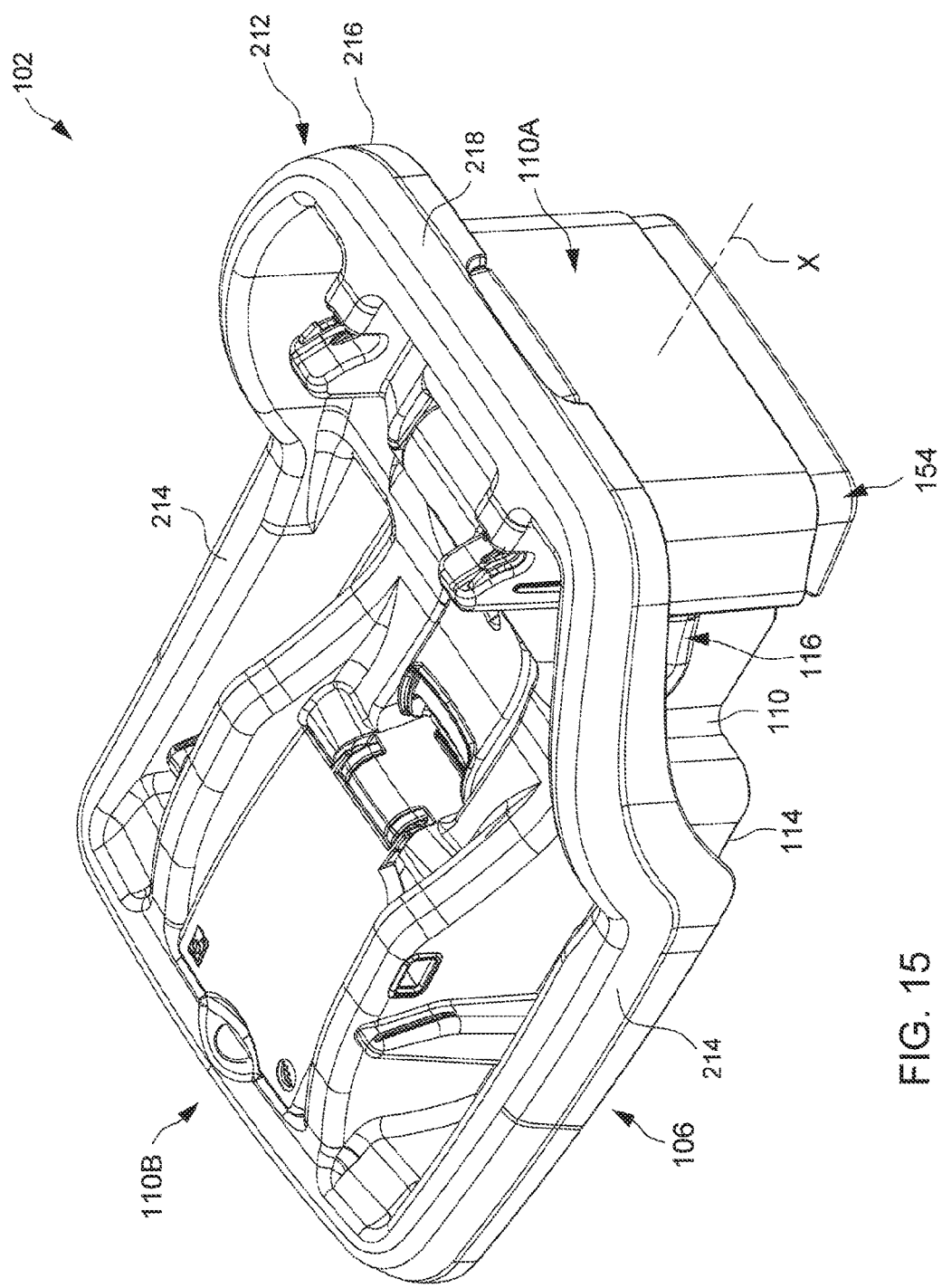

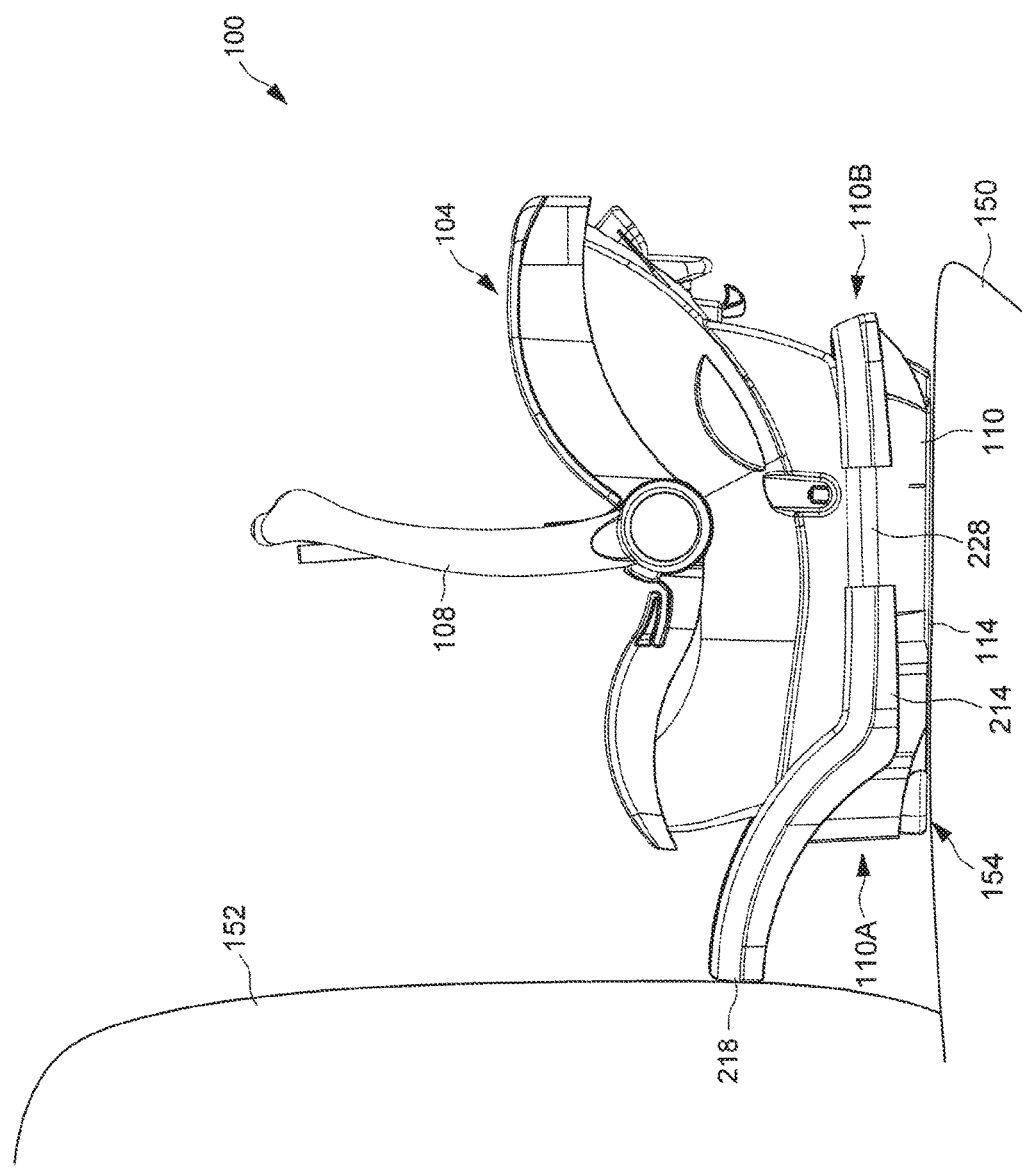

US 10,442,324 B2

CHILD SAFETY SEAT

CROSS-REFERENCE TO RELATED APPLICATION(S)

This application respectively claims priority to U.S. Provisional Patent Application No. 62/362,740 filed on Jul. 15, 2016, the disclosure of which is incorporated herein by reference.

BACKGROUND

1. Field of the Invention

The present invention relates to child safety seats.

2. Description of the Related Art

A child safety seat is typically used in an automobile vehicle to properly restrain a young child in the event of accidental collision. It is widely known that a child safety seat that is placed in a rear facing position can provide better protection, because it can distribute crash forces over a larger portion of the body (i.e., child's head and torso). Accordingly, safety experts and car seat manufacturers encourage using the child safety seat in the rear facing position for older and heavier children beyond what is mandated by safety regulations.

However, it may be challenging to seat an older child of a larger body size in the rear facing position because there may not be enough space for placement of the child's legs, and parents may feel that the legs would be injured during collision when the seat rebounds onto the seatback of the vehicle seat.

Therefore, there is a need for an improved child safety seat that can provide more leg room, and address at least the foregoing issues.

SUMMARY

The present application describes a child safety seat that can create more room for receiving the legs of a child when it is installed in a rear facing position. The child safety seat includes a child seat for receiving a child, and a support base for supporting the child seat, the child seat being detachably installable on the support base. The support base includes a shell body having an end and a bottom surface, and an extension part disposed adjacent to the end of the shell body and having a foremost end surface. The child safety seat is positionable on a vehicle seat with the foremost end surface in contact with a seatback of the vehicle seat, the extension part being movable relative to the shell body substantially parallel to the bottom surface between a first and a second position, the foremost end surface being adjacent to the end of the shell body in the first position and deployed away from the end of the shell body in the second position.

BRIEF DESCRIPTION OF THE DRAWINGS

FIG. 15 is a perspective view illustrating a support base provided with another construction of the extension part; and FIG. 16 is a side view illustrating the support base shown in FIG. 15 with a child seat mounted thereon and with the extension part in a deployed position.

DETAILED DESCRIPTION OF THE EMBODIMENTS

Figure 1:
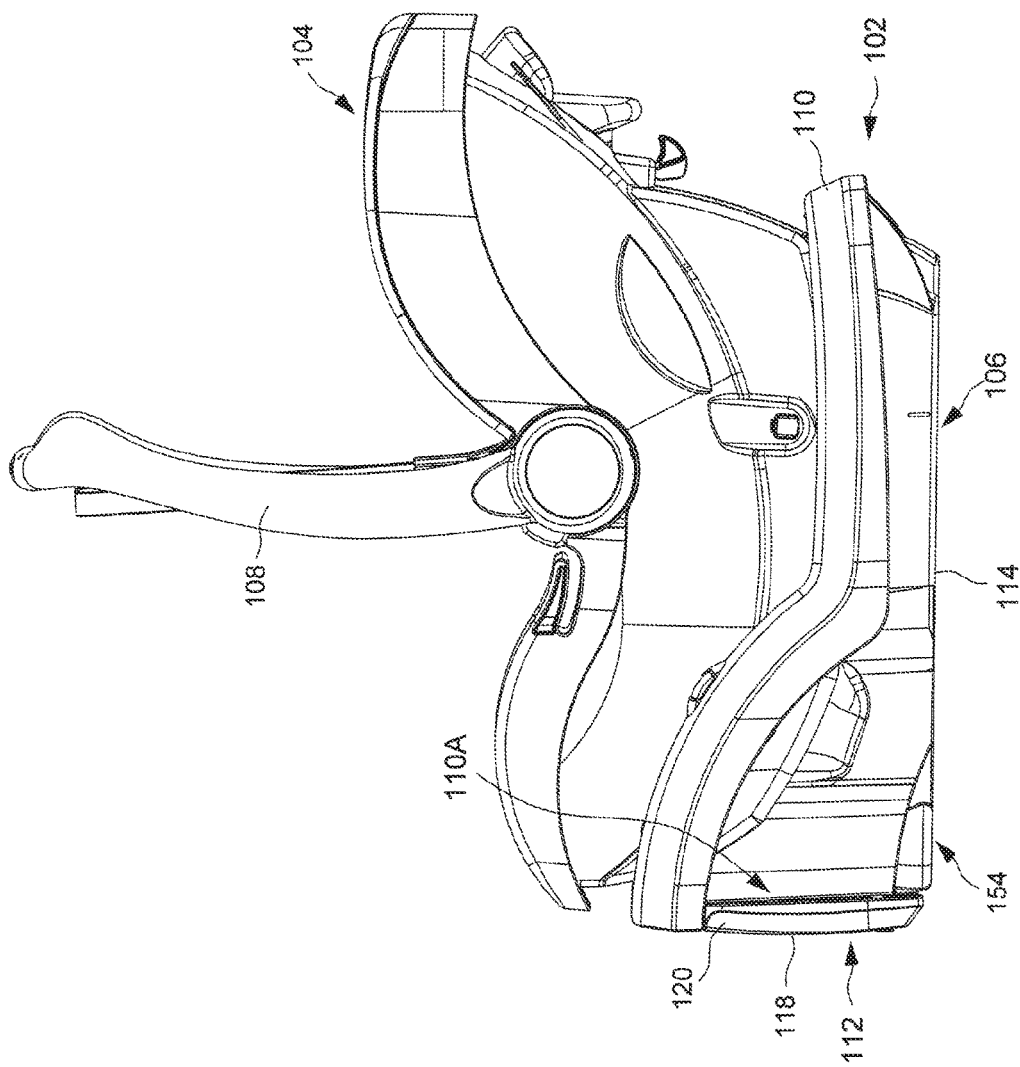
FIG. 1 is a side view illustrating an embodiment of a child safety seat.

FIG. 1 is a side view illustrating an embodiment of a child safety seat 100. The child safety seat 100 can include a support base 102, and a child seat 104 that can be detachably installed on the support base 102. The support base 102 can have a bottom surface 106 suitable for resting on a vehicle seat, provide stable support for the child seat 104, and facilitate installation of the child safety seat 100 on a vehicle seat. The child seat 104 can be adapted to receive a child, and can be assembled with a carrying handle 108 for facilitating transport of the child seat 104.

Figure 2:
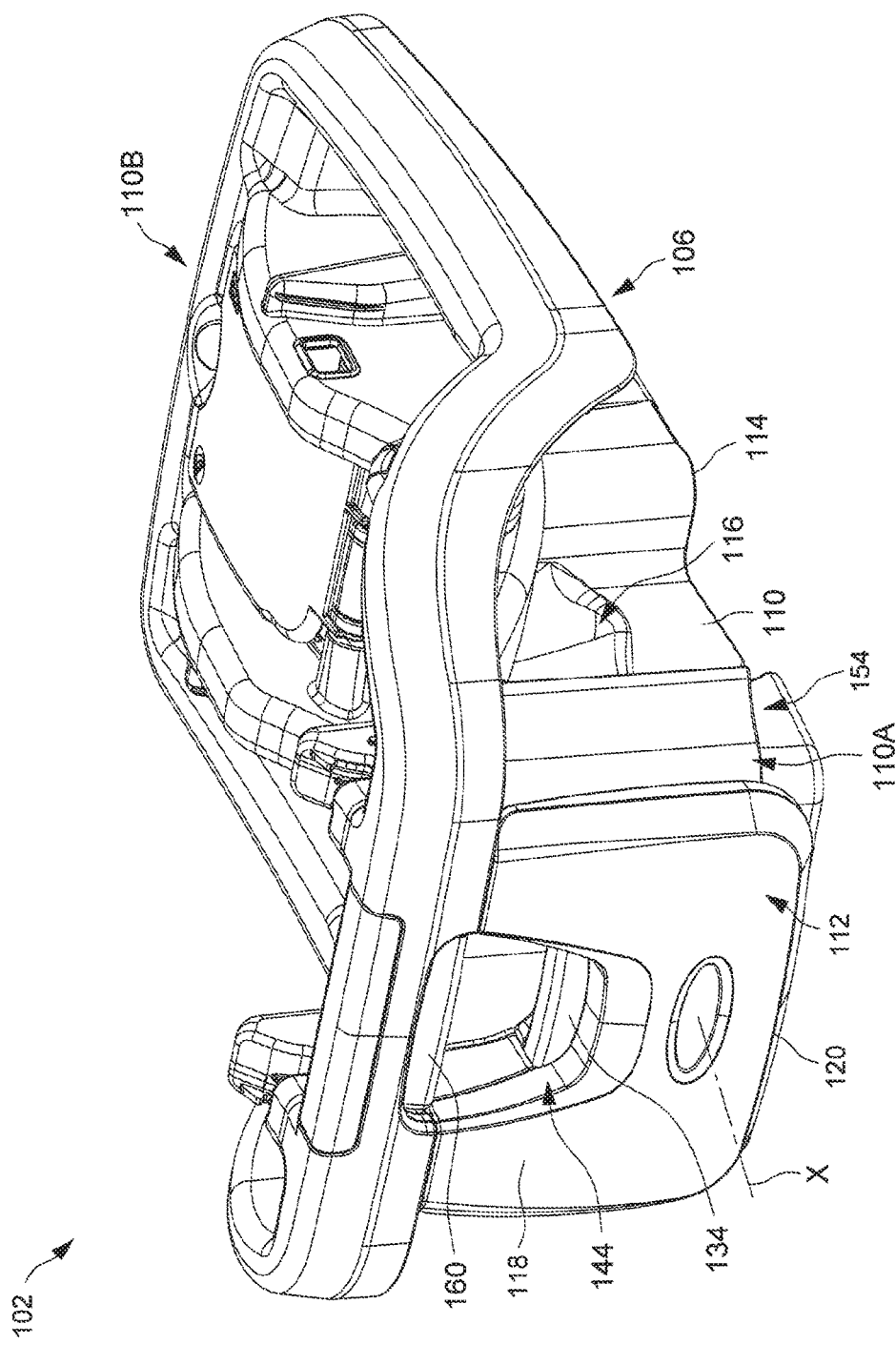
FIG. 2 is a perspective view illustrating a support base of the child safety seat shown in FIG. 1.
Figure 3:
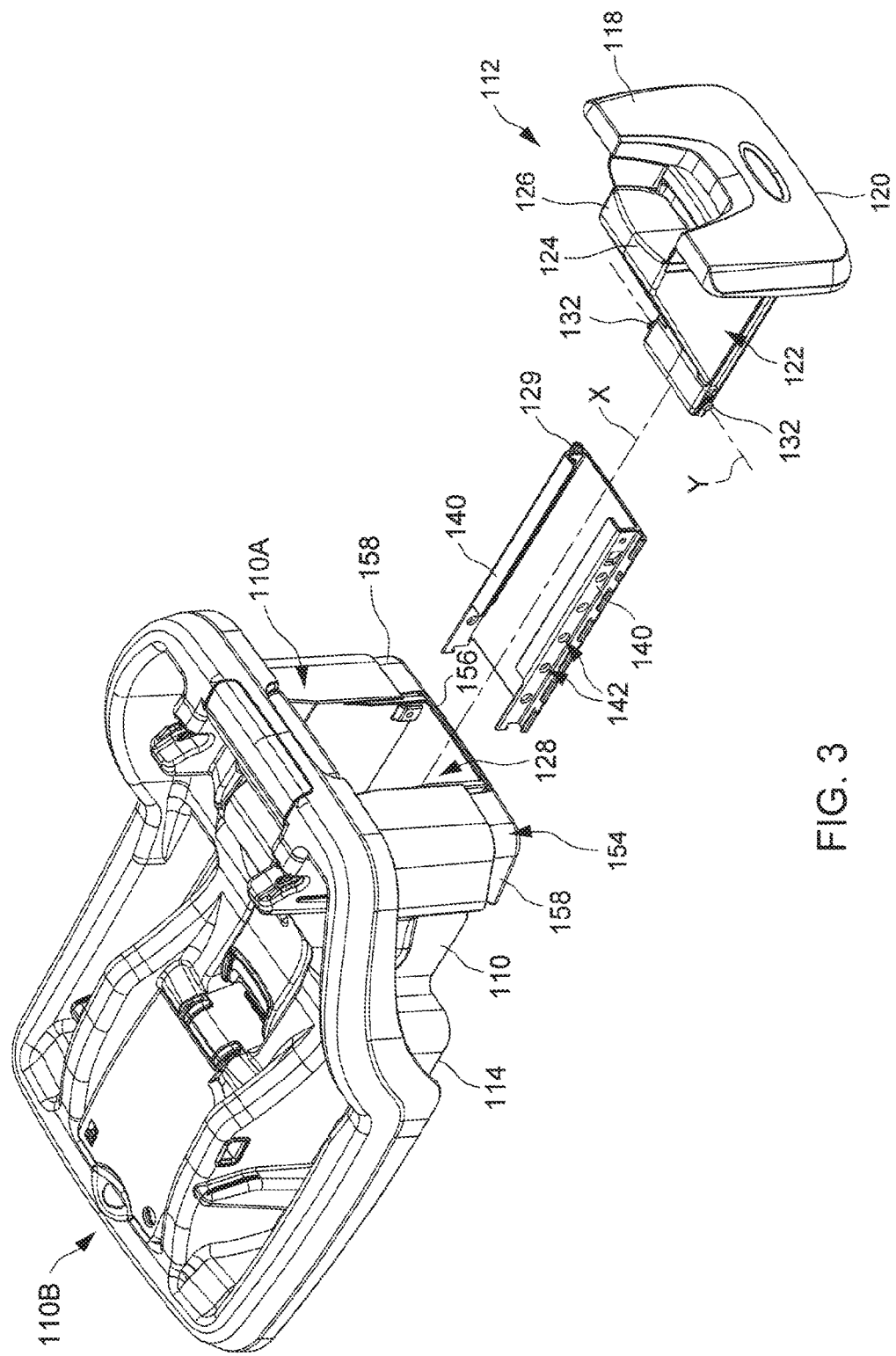
FIG. 3 is a partially exploded view illustrating some inner construction details of the support base for receiving the assembly of an extension part.
Figure 4:
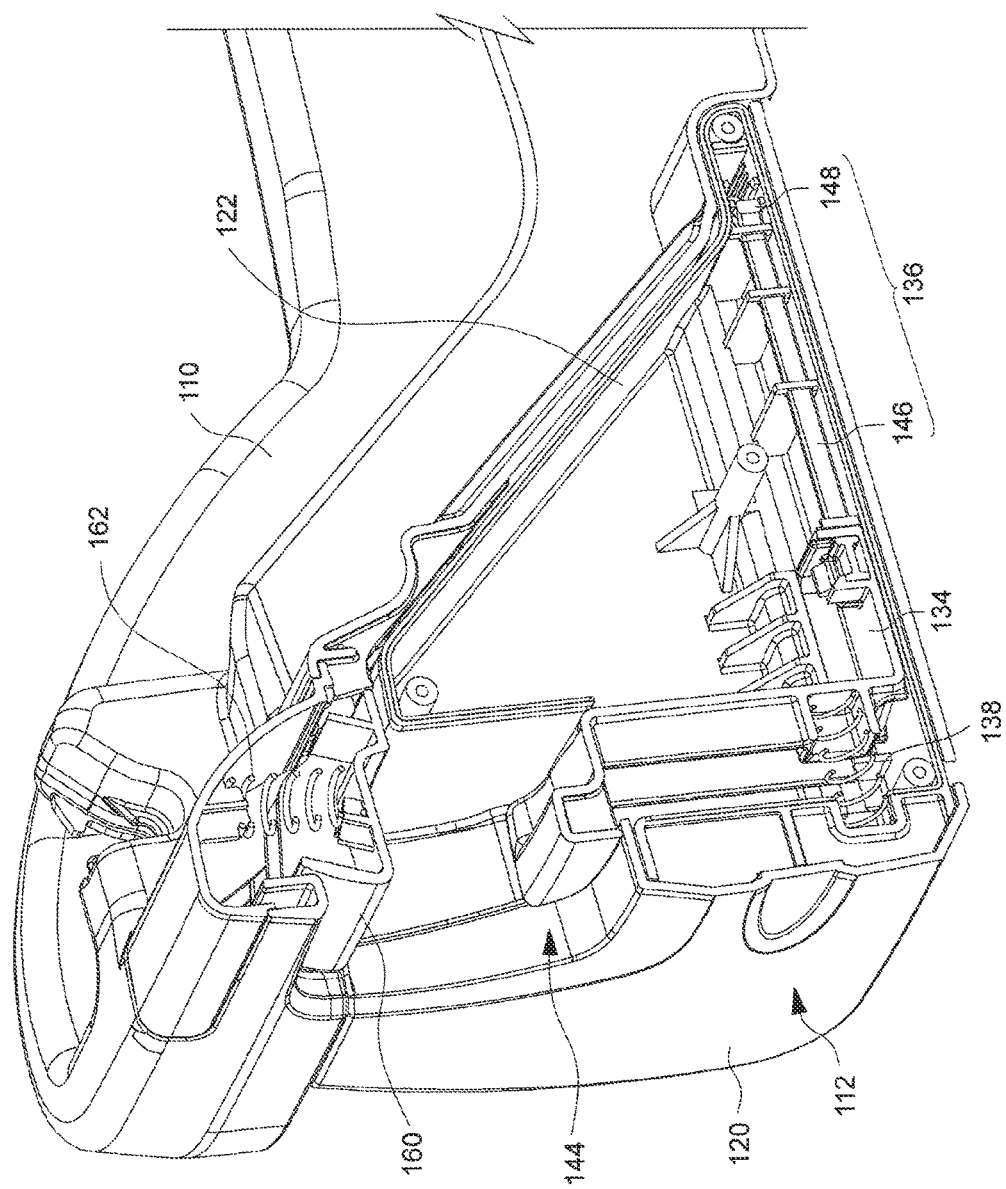
FIG. 4 is a cross-sectional view illustrating the assembly of the extension part with the support base.
Figure 5:
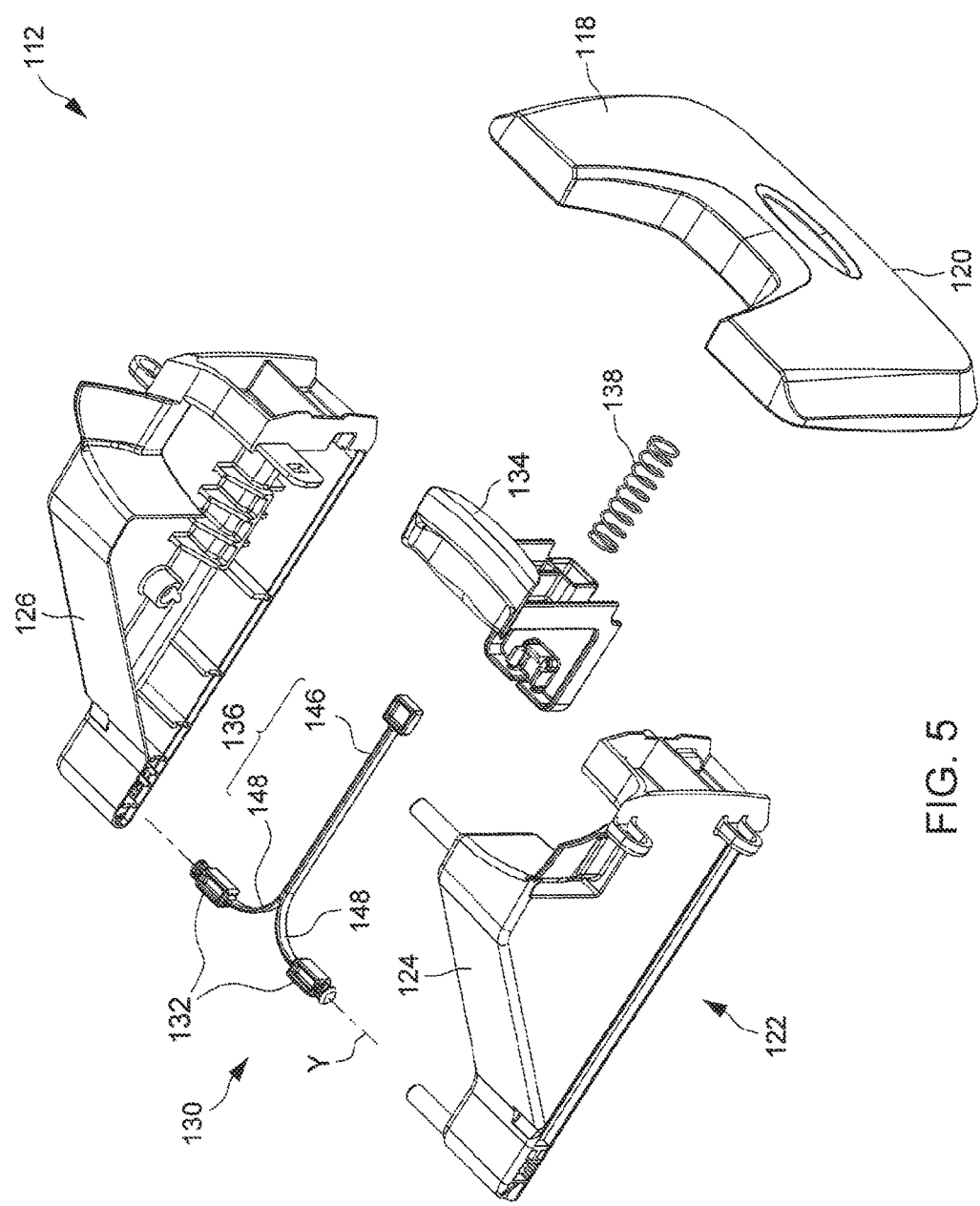
FIG. 5 is an exploded view illustrating the construction of the extension part and a latch mechanism assembled therewith.

In conjunction with FIG. 1, FIG. 2 is a perspective view illustrating the support base 102 alone, and FIGS. 3-5 are various views illustrating construction details of the support base 102. Referring to FIG. 2, the support base 102 can include a rigid shell body 110 and an extension part 112. Examples of suitable materials for making the shell body 110 can include, e.g., rigid plastics. The shell body 110 can support the child seat 104, and can have a large bottom surface 114 adapted to rest on a vehicle seat. The bottom surface 114 of the shell body 110 can define at least partially the bottom surface 106 of the support base 102. Moreover, the shell body 110 can have a belt channel 116 that extends transversally from a left to a right side of the support base 102. The shell body 110 can have two opposite ends 110A and 110B, and the belt channel 116 can be disposed closer to the end 110A than the end 110B of the shell body 110. When the support base 102 is installed on a vehicle seat, an anchoring belt (not shown) may be disposed along the belt channel 116 to securely fasten the support base 102 on the vehicle seat.

Referring to FIGS. 2-5, the extension part 112 can have a foremost end surface 118, and can be disposed adjacent to the end 110A of the shell body 110. According to an embodiment, the extension part 112 can include a panel 120 and an insert portion 122 fixedly connected with each other. The foremost end surface 118 may be defined on the panel 120, which is exposed outside the shell body 110. The insert portion 122 may be exemplary formed by two casing portions 124 and 126 that are respectively connected fixedly with the panel 120. The extension part 112 can be slidably connected to the shell body 110 with the insert portion 122 received at least partially in a cavity 128 of the shell body 110, whereby the extension part 112 can slide along a lengthwise axis X extending from the end 110A to the end 110B of the shell body 110. For example, the cavity 128 may include a guide track 129, and the insert portion 122 of the extension part 112 may be guided for sliding along the guide track 129. According to some embodiment, the extension part 112 may slide relative to the shell body 110 substantially parallel to the bottom surface 106 of the support base 102, in particular substantially parallel to the bottom surface 114 of the shell body 110.

Figure 6:
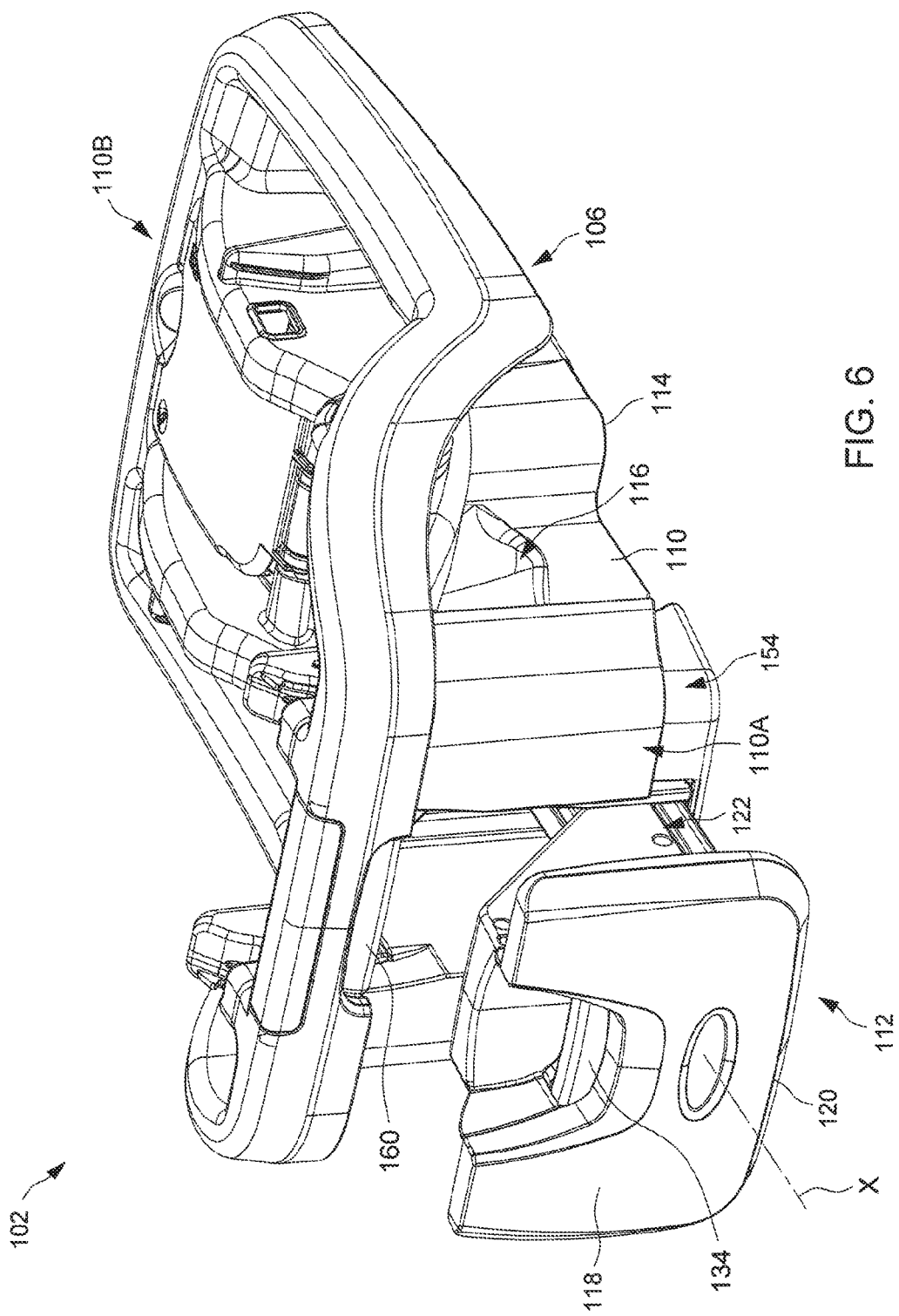
FIG. 6 is a perspective view illustrating the support base with the extension part in a deployed position.

The sliding connection between the extension part 112 and the shell body 110 allows the extension part 112 to slide relative to the shell body 110 between two positions respectively shown in FIGS. 2 and 6, the panel 120 and the foremost end surface 118 thereon being adjacent to the end 110A of the shell body 110 in the retracted position of FIG. 2 and deployed outward horizontally away from the end 110A of the shell body 110 in the deployed position of FIG. 6.

Referring to FIGS. 2-6, the support base 102 can further include a latch mechanism 130 operable to lock the extension part 112 in any of the retracted and deployed positions. According to an embodiment, the latch mechanism 130 may be assembled with the extension part 112. For example, the extension part 112 may have a hollow interior delimited at least partially by the two casing portions 124 and 126, and the latch mechanism 130 may be received at least partially in the hollow interior of the extension part 112. The latch mechanism 130 can include two latches 132, an actuator 134, a linkage 136 and a spring 138.

The two latches 132 may be assembled with the extension part 112 for transversal movement along a transversal axis Y that is substantially orthogonal to the lengthwise axis X. More specifically, the two latches 132 may be disposed in the insert portion 122, and can be guided to slide in transversally opposite directions to protrude outward or retract inward at two opposite sides of the insert portion 122. The two latches 132 can slide away from each other to protrude outward and respectively engage with two opposite sidewalls 140 provided in the cavity 128 of the shell body 110 for locking the extension part 112 in any of the retracted and deployed positions, and slide toward each other to retract inward and respectively disengage from the two sidewalls 140 for movement of the extension part 112 between the retracted and deployed positions. The two sidewalls 140 may be exemplary formed integrally with the guide track 129 affixed in the cavity 128 of the shell body 110. A plurality of openings 142 corresponding to the retracted and deployed positions of the extension part 112 may be provided symmetrically along the two sidewalls 140, and the extension part 112 can be locked in position by engaging the two latches 132 with corresponding openings 142 on the two sidewalls 140.

The actuator 134 can be operatively connected with the two latches 132 via the linkage 136, and can be exposed for operation in an opening 144 provided on the foremost end surface 118 of the extension part 112. The actuator 134 can be assembled with the extension part 112 for sliding movement along the lengthwise axis X relative to the extension part 112.

The linkage 136 can be respectively connected with the two latches 132 and the actuator 134. According to an example of construction, the linkage 136 can include a central portion 146, and two diverging portions 148 elastically deformable that are respectively attached to the central portion 146. The central portion 146 is connected with the actuator 134, and can have an elongate shape. Each of the two diverging portions 148 can have a curved shape, and the two diverging portions 148 can symmetrically project and further connect with the two latches 132 at two sides of the central portion 146. The connection through the linkage 136 allows the actuator 134, the linkage 136 and the two latches 132 to move concurrently between a locking state where the two latches 132 are respectively engaged with the two sidewalls 140 and an unlocking state where the two latches 132 are respectively disengaged from the two sidewalls 140. In particular, the ability of the diverging portions 148 to deform elastically can link the sliding displacement of the actuator 134 and the central portion 146 along the lengthwise axis X to the sliding movements of the two latches 132 along the transversal axis Y.

Referring to FIG. 5, the spring 138 can be disposed so as to bias the central portion 146 and the actuator 134 in a direction for urging the latches 132 toward the locking state. For example, the spring 138 can have two opposite ends respectively connected with the actuator 134 and an inner surface of the panel 120. The biasing force applied by the spring 138 tends to urge the actuator 134 away from the panel 120 for urging the latches 132 toward the locking state, and a caregiver can introduce one or more finger through the opening 144 and push the actuator 134 toward the panel 120 against the spring force for urging the latches 132 to the unlocking state.

Figure 7:
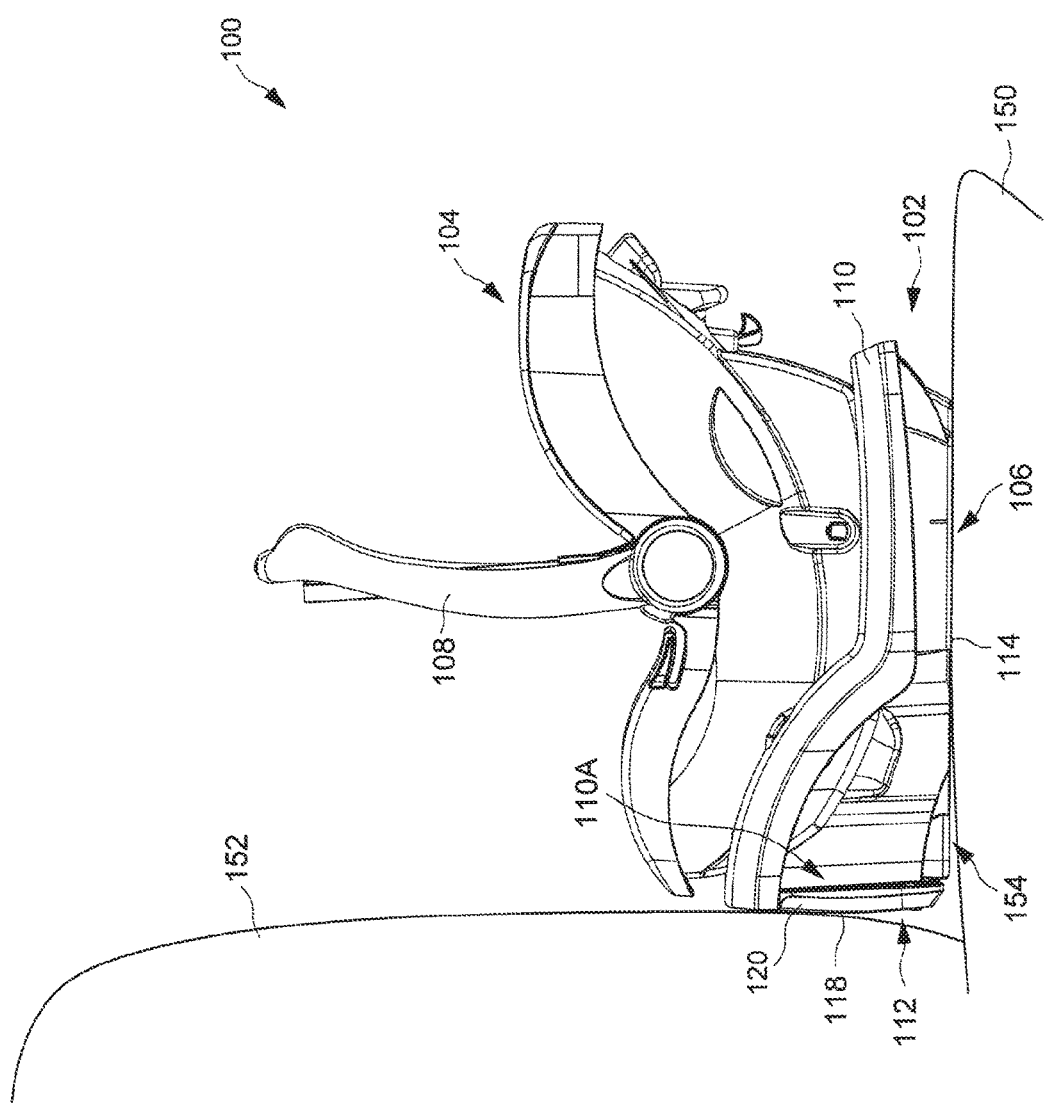
FIG. 7 is a side view illustrating the child safety seat installed on a vehicle seat with the extension part in a retracted position.

In conjunction with FIGS. 1-6, FIGS. 7 and 8 are two schematic views illustrating exemplary use of the child safety seat 100 on a vehicle seat 150. Referring to FIG. 7, the child safety seat 100 can be installed on a vehicle seat with the foremost end surface 118 on the panel 120 of the extension part 112 in contact with a seatback 152 of a vehicle seat 150, and the child seat 104 facing the seatback 152 of the vehicle seat 150 for seating a child in a rear facing position. When a younger child having a smaller size is to be seated on the child safety seat 100 in the rear facing position, the extension part 112 can be in the retracted position with respect to the shell body 110. In the retracted position, the panel 120 and the foremost end surface 118 thereon can be adjacent to the end 110A of the shell body 110.

Figure 8:
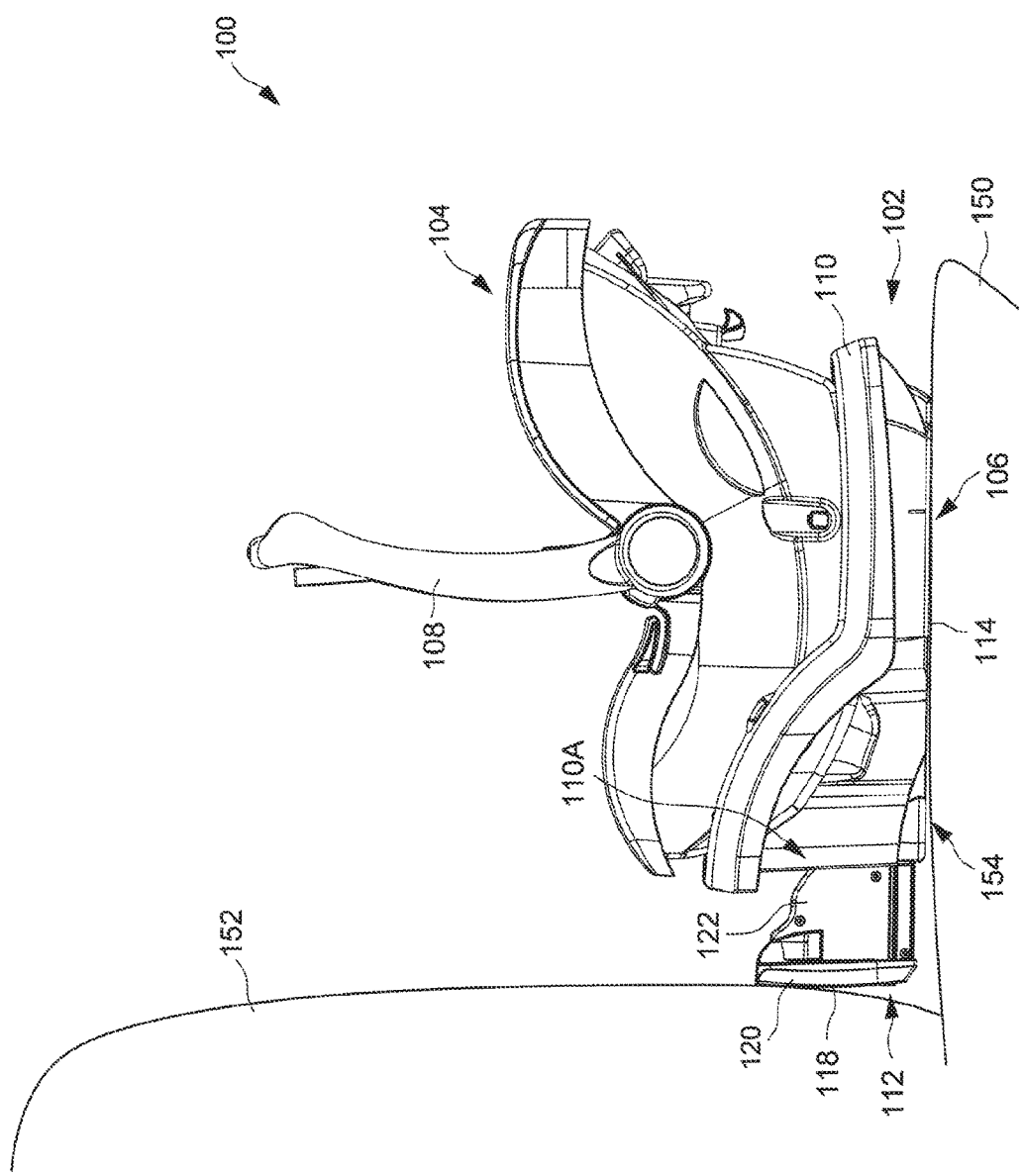
FIG. 8 is a side view illustrating the child safety seat installed on a vehicle seat with the extension part in a deployed position.

Referring to FIG. 8, when an older child having a larger size is to be seated on the child safety seat 100 in the rear facing position, the extension part 112 can be adjusted to the deployed position with respect to the shell body 110, and the child safety seat 100 can be installed with only the foremost end surface 118 on the panel 120 of the extension part 112 in contact with the seatback 152 of the vehicle seat 150. In the deployed position, the panel 120 and the foremost end surface 118 thereon are displaced horizontally away from the end 110A of the shell body 110, which creates more space between the seatback 152 of the vehicle seat 150 and the child seat 104 for receiving the child's legs. Accordingly, a more comfortable sitting environment can be provided for a child of a larger size.

Referring to FIGS. 1-8, the support base 102 can further include a recline foot 154 that is connected with the shell body 110 and is disposed adjacent to the extension part 112. The recline foot 154 is movable relative to the shell body 110 to adjust an inclination of the support base 102 on a vehicle seat. According to an embodiment, the recline foot 154 may be pivotally connected with the shell body 110. The recline foot 154 may have a bottom portion 156, and two raised portions 158 fixedly connected with the bottom portion 156. The recline foot 154 can straddle the extension part 112, the bottom portion 156 extending across an underside of the extension part 112 and the two raised portions 158 disposed at a left and a right side of the extension part 112.

A lock mechanism including an actuator 160 may be provided to lock the recline foot 154 in position with respect to the shell body 110. According to an example of construction, the actuator 160 may be movably assembled with the shell body 110 at a location above the actuator 134, and can be connected with latching portions (not shown) that can respectively engage or disengage the two raised portions 158 for locking or unlocking the recline foot 154. The actuator 160 can be pressed to unlock the recline foot 154. Once the recline foot 154 is in the desired position, the caregiver can release the actuator 160, which can recover its initial state under the biasing force applied by a spring 162 (better shown in FIG. 4).

Figure 9:
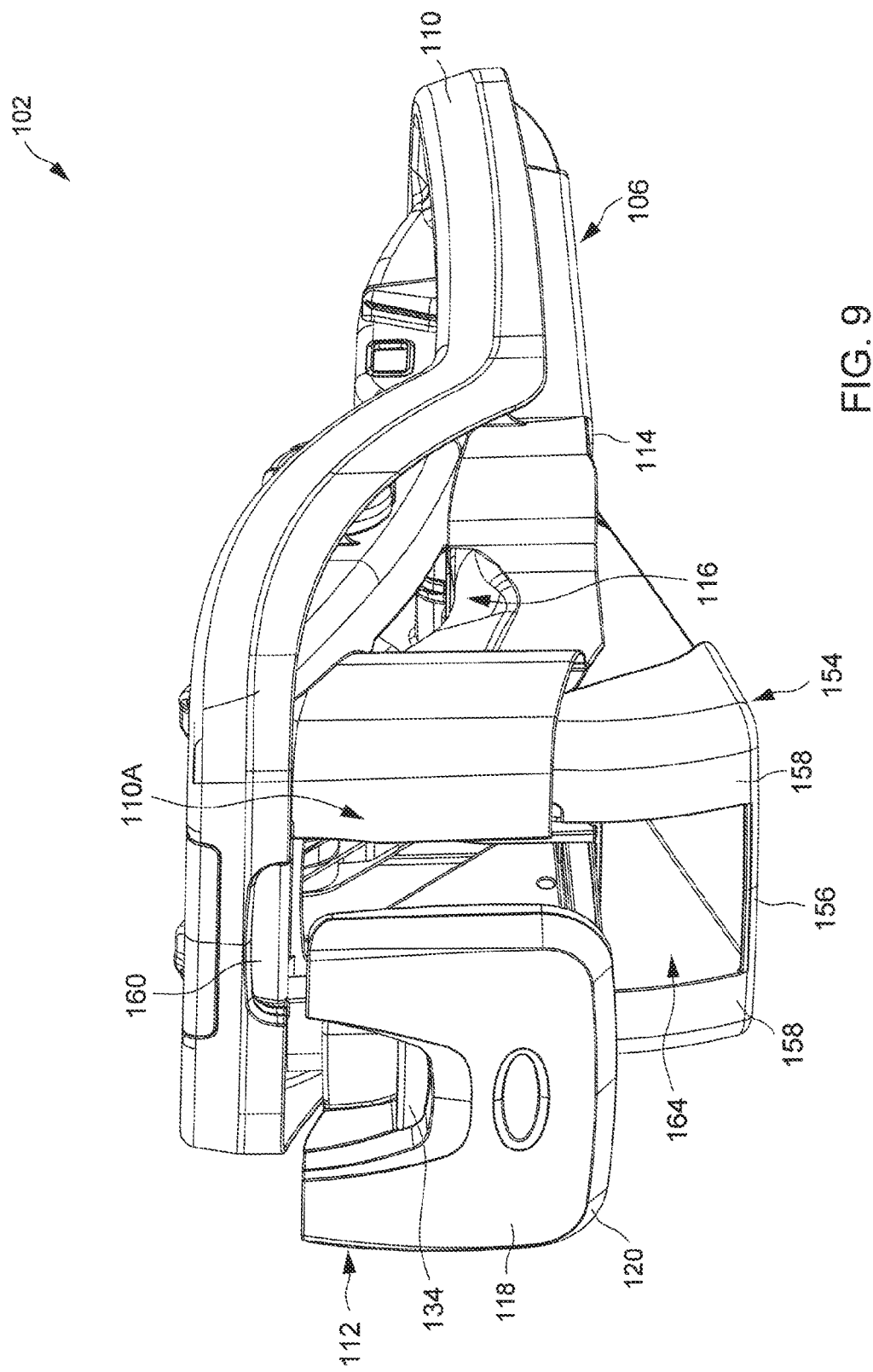
FIG. 9 is a perspective view illustrating the support base with the extension part in the deployed position and a recline foot rotated downward to protrude outward at a bottom of the support base.
Figure 10:
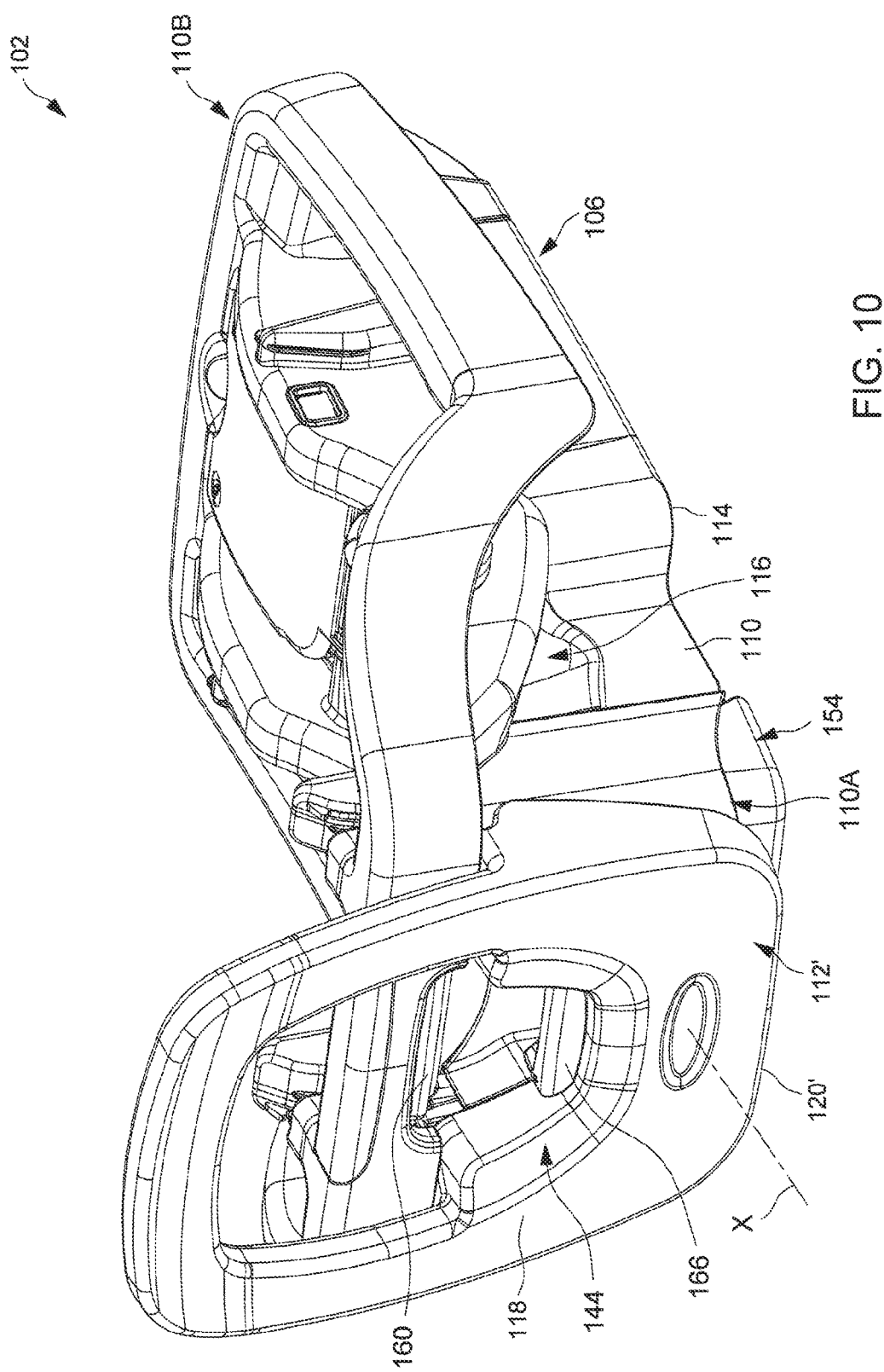
FIG. 10 is a perspective view illustrating a support base provided with a variant construction of the extension part.
Figure 11:
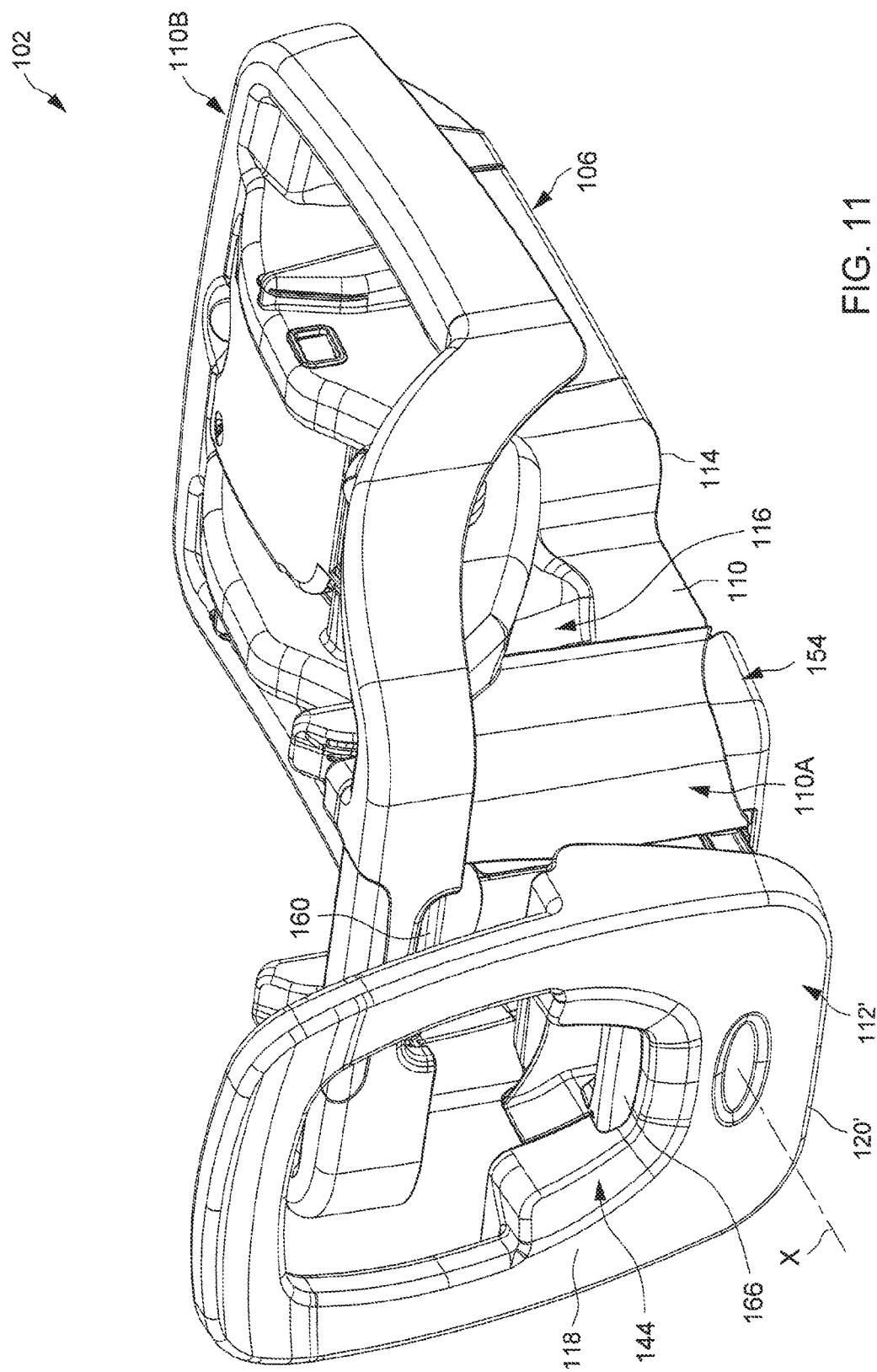
FIG. 11 is a perspective view of the support base shown in FIG. 10 with the extension part in the deployed position.

The recline foot 154 is movable independently from the extension part 112 for adjusting the inclination of the support base 102 on a vehicle seat. For example, the recline foot 154 may move relative to the shell body 110 for adjustment while the extension part 112 remains stationary in the retracted or deployed position. FIG. 9 is a perspective view illustrating an example of configuration in which the extension part 112 is in the deployed position and the recline foot 154 rotated downward to protrude outward at a bottom of the shell body 110 for inclining the support base 102 on a vehicle seat. In the configuration of FIG. 9, an increased gap may be created between the extension part 112 and the bottom portion 156 of the recline foot 154 and the extension part 112 can contact with a seatback of a vehicle seat at a relatively higher position, which can help to prevent rotation and rebound of the child safety seat during car collision.

According to some embodiment, the same extension part 112 described previously may be assembled with the recline foot 154 so that both the extension part 112 and the recline foot 154 move in unison while the recline foot 154 moves relative to the shell body 110 for adjusting the inclination of the support base 102. For example, a cavity 164 between the two raised portions 158 (better shown in FIG. 9) may receive the assembly of the extension part 112 (including the latch mechanism 130 assembled therewith) and the guide track 129. Accordingly, the extension part 112 may be locked with the recline foot 154 in either of the deployed and retracted position, and may remain adjacent to the bottom portion 156 of the recline foot 154 in any inclined position of the support base 102.

FIGS. 10-14 are various schematic views illustrating a variant construction of an extension part 112' provided in the support base 102. Referring to FIGS. 10-14, the extension part 112' can be similar to the extension part 112 described previously, and include the insert portion 122 and a panel 120' fixedly connected with each other. The extension part 112' can be slidably connected to the shell body 110 with the insert portion 122 received at least partially in the cavity 128 of the shell body 110 and the panel 120' exposed outward. The panel 120' can stretch above a top of the shell body 110, and define the foremost end surface 118 that is positionable in contact with a seatback of a vehicle seat. Like previously described, the extension part 112' can slide along the lengthwise axis X between a retracted position shown in FIG. 10 where the panel 120' and the foremost end surface 118 thereon are adjacent to the end 110A of the shell body 110, and a deployed position shown in FIG. 11 where the panel 120' and the foremost end surface 118 thereon are deployed outward horizontally away from the end 110A of the shell body 110. In either of the retracted and deployed position, the extension part 112' can protrude above the top of the shell body 100 to offer an increased area of contact with a seatback of a vehicle seat, thereby helping to prevent rotation and rebound of the child safety seat during car collision.

Figure 12:
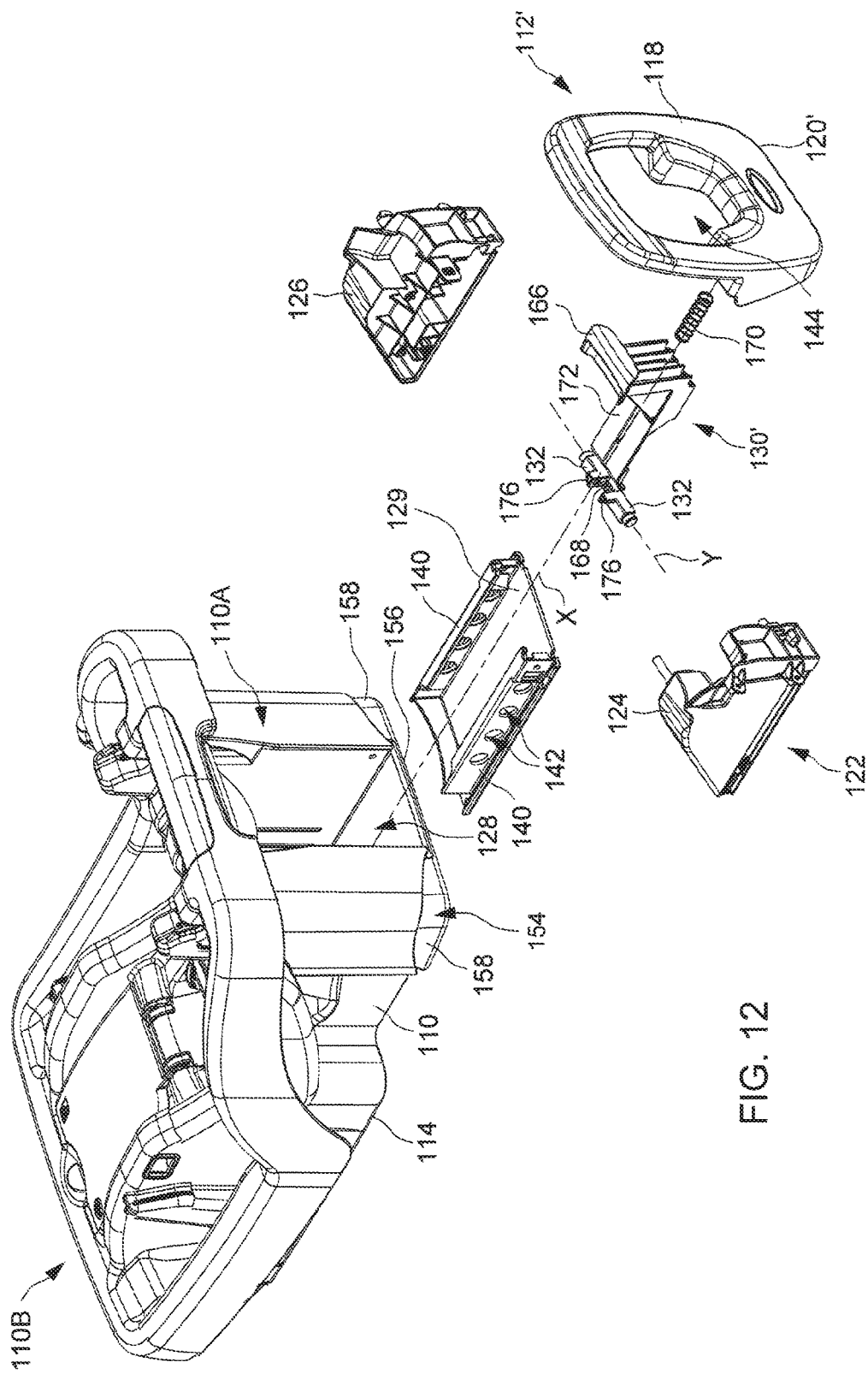
FIG. 12 is an exploded view illustrating construction details of the support base and the extension part shown in FIG. 10.
Figure 13:
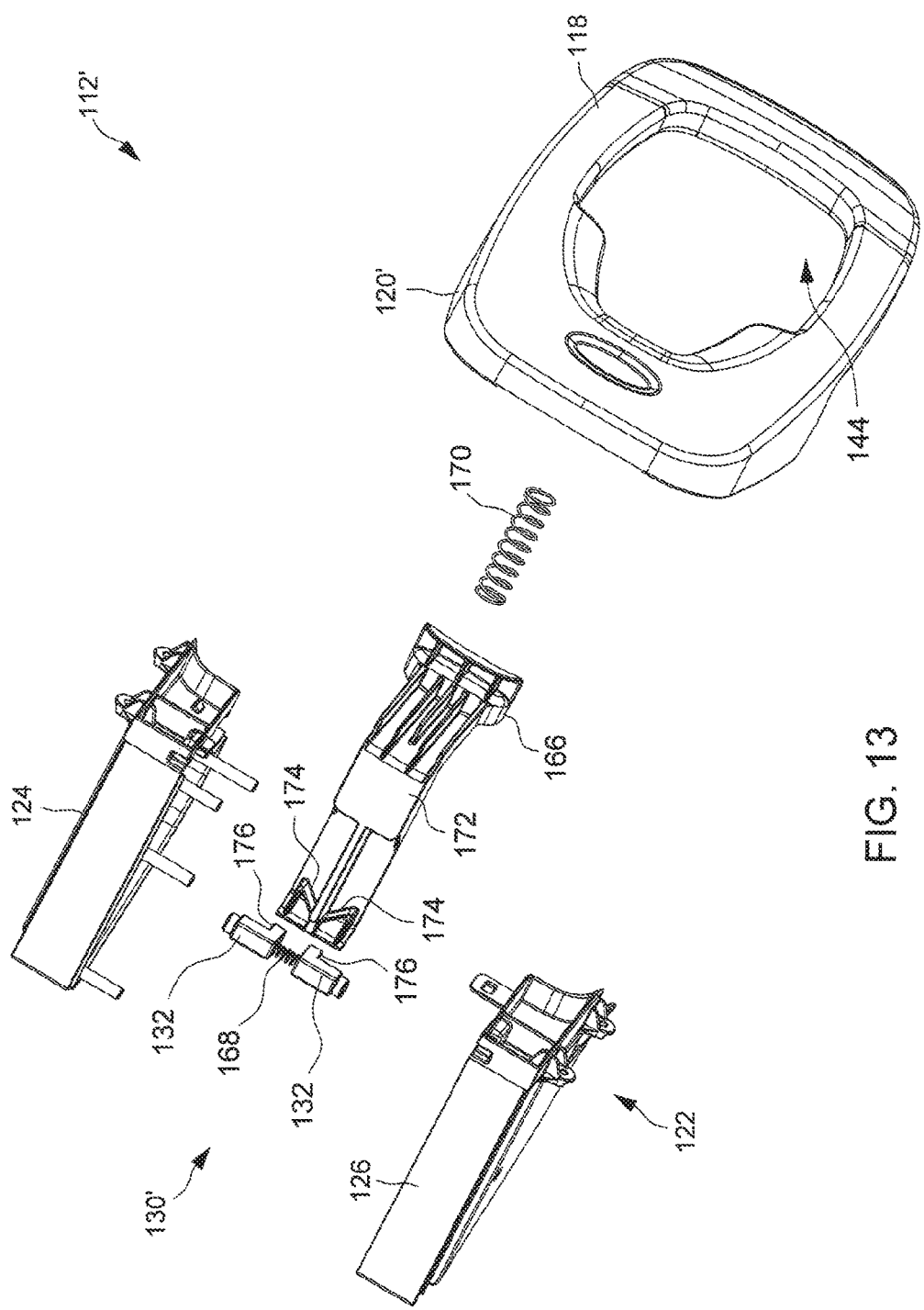
FIG. 13 is an exploded view illustrating a latch mechanism provided in the extension part shown in FIG. 13.

Referring to FIGS. 12 and 13, the support base 102 can further include a latch mechanism 130' operable to lock the extension part 112' in any of the retracted and deployed positions. According to an embodiment, the latch mechanism 130' may be assembled with the extension part 112'. For example, the extension part 112' may have a hollow interior delimited at least partially by the two casing portions 124 and 126 of the insert portion 122, and the latch mechanism 130' may be received at least partially in the hollow interior of the extension part 112'. The latch mechanism 130' can include the two latches 132, an actuator 166 and two springs 168 and 170.

Like previously described, the two latches 132 may be assembled in the insert portion 122 of the extension part 112' for transversal movement along the transversal axis Y that is substantially orthogonal to the lengthwise axis X. The two latches 132 can slide away from each other to protrude outward or toward each other to retract inward at two opposite sides of the insert portion 122. The two latches 132 can slide away from each other to protrude outward and respectively engage with two opposite sidewalls 140 for locking the extension part 112' in any of the retracted and deployed positions, and slide toward each other to retract inward and respectively disengage from the two sidewalls 140 for movement of the extension part 112' between the retracted and deployed positions.

Referring to FIGS. 12 and 13, the actuator 166 can be operatively connected with the two latches 132, and can be exposed for operation through the opening 144 provided on the foremost end surface 118 of the extension part 112'. The actuator 166 can be assembled with the extension part 112' for sliding movement along the lengthwise axis X relative to the extension part 112'. Moreover, the actuator 166 can include a tongue 172 having two symmetrical ramp surfaces 174. According to an example of construction, the actuator 166 including the tongue 172 and the ramp surfaces 174 may be formed integrally as a single body. According to another example of construction, the tongue 172 with the ramp surfaces 174 thereon may be fixedly attached to the actuator 166. The two latches 132 can have two protruding portions 176 respectively in sliding contact with the two ramp surfaces 174.

Referring to FIGS. 12 and 13, the spring 168 can be oppositely connected with the two latches 132. The biasing force applied by the spring 168 can urge the two latches 132 away from each other toward the locking state. The other spring 170 can have two opposite ends respectively connected with the actuator 166 and an inner surface of the panel 120'. The biasing force applied by the spring 170 tends to urge the actuator 166 away from the panel 120'.

In the latch mechanism 130', the two latches 132 can be biased by the spring 168 to respectively engage with the two sidewalls 140 for locking the extension part 112' in the retracted or deployed position. For moving the extension part 112', a caregiver can push the actuator 166 toward the panel 120' against the biasing force applied by the spring 170, which urges the two latches 132 to move toward each other and disengage from the two sidewalls 140 due to the respective sliding contact between the latches 132 and the ramp surfaces 174. Once the extension part 112' reaches the desired position, the caregiver can release the actuator 166, which can recover its initial position owing to the biasing force applied by the spring 170. The two latches 132 biased by the spring 168 then can recover the locking state.

Although the latch mechanism 130' has been described in association with the extension part 112', it will be understood that this is not a limiting example. For example, according to other embodiments, the latch mechanism 130' may be associated with the extension part 112 described previously. According to some other embodiments, the latch mechanism 130 previously illustrated in connection with the extension part 112 may also be associated with the extension part 112'.

Figure 14:
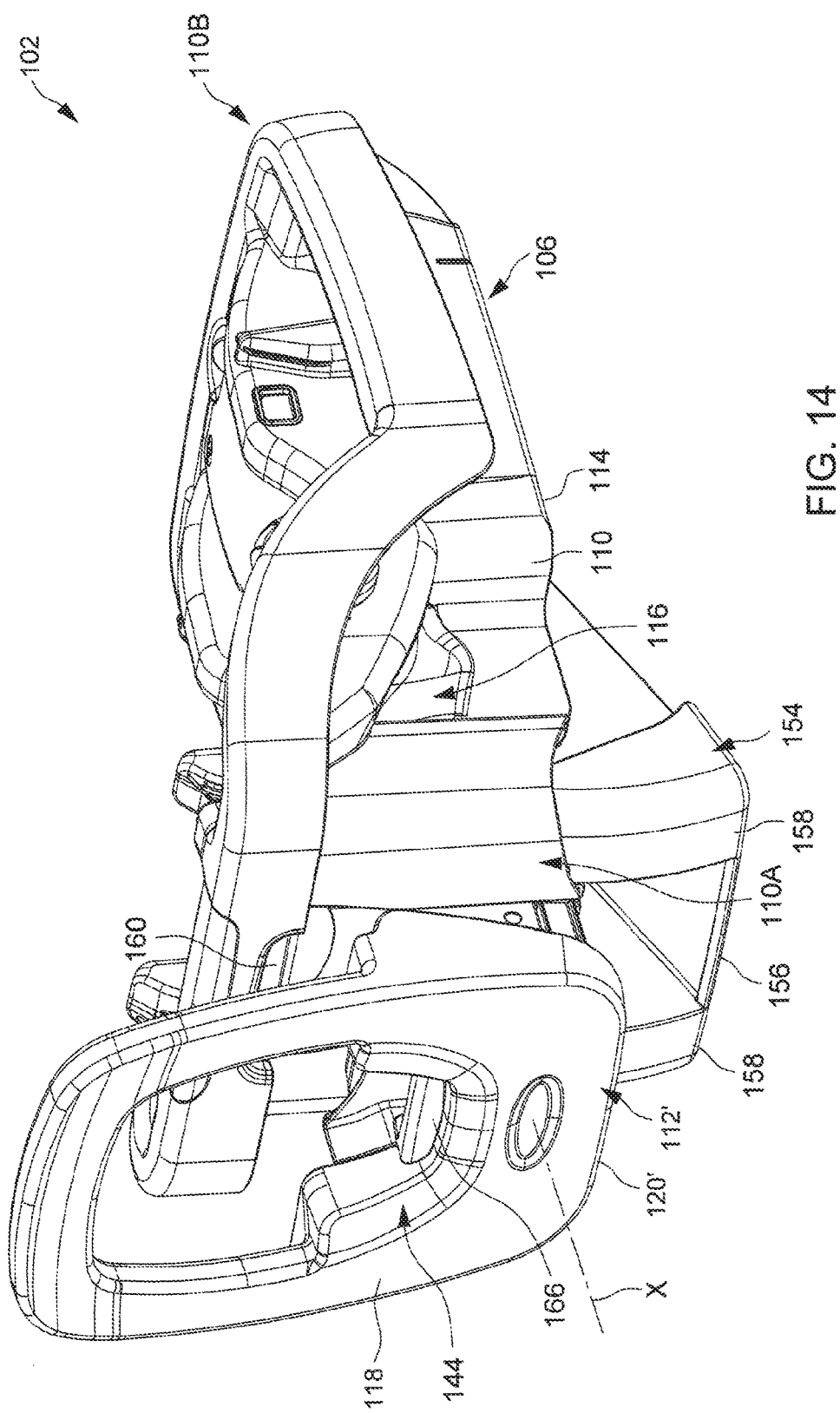
FIG. 14 is a perspective view illustrating the support base shown in FIG. 10 with the extension part in the deployed position and a recline foot rotated downward to protrude outward at a bottom of the support base.

Referring to FIGS. 10-14, the support base 102 can further include the recline foot 154 that is connected with the shell body 110 and is disposed adjacent to the extension part 112'. The recline foot 154 can be adjusted like described previously for adjusting an inclination of the support base 102. FIG. 14 is a perspective view illustrating an example of configuration in which the extension part 112' is in the deployed position and the recline foot 154 is rotated downward to protrude outward at a bottom of the shell body 110.

It will be appreciated that the extension part provided on the support base is not limited to the aforementioned examples, and other shapes may be possible. FIGS. 15 and 16 are respectively a perspective view and a side view illustrating the support base 102 provided with another extension part 212 that can substitute for the extension parts 112 and 112' described previously. The extension part 212 can be assembled with the shell body 110 for sliding along the lengthwise axis X substantially parallel to the bottom surface 106 of the support base 102, in particular substantially parallel to the bottom surface 114 of the shell body 110. In this embodiment, the extension part 212 can have two generally parallel side segments 214 respectively connected slidably with a left and a right side of the shell body 110, and a transversal segment 216 fixedly connected with the two side segments 214. The two side segments 214 may be respectively connected slidably with two bar segments 228 (better shown in FIG. 16) that are fixedly attached to the left and right sides of the shell body 110. The transversal segment 216 can define a foremost end surface 218 extending between the two side segments 214. The two side segments 214 and the transversal segment 216 can be exposed outside the shell body 110.

FIG. 16 is a side view illustrating the support base 102 shown in FIG. 15 with the child seat 104 mounted thereon and installed on a vehicle seat 150. The extension part 212 can slide along the lengthwise axis X between a retracted position shown in FIG. 15 where the transversal segment 216 and the foremost end surface 218 thereon are adjacent to the end 110A of the shell body 110, and a deployed position shown in FIG. 16 where transversal segment 216 and the foremost end surface 218 are deployed outward horizontally away from the end 110A of the shell body 110. While the extension part 212 is in either of the retracted and deployed position, the support base 102 can be installed on a vehicle seat with the foremost end surface 218 in contact with a seatback of the vehicle seat. As shown in FIG. 15, the extension part 212 in the retracted position can partially conform to an outer contour of the shell body 110 that extends across the end 110A and at least partially along a left and a right side of the shell body 110. In the deployed position shown in FIG. 16, the extension part 212 can increase a leg room between the seatback 152 of the vehicle seat 150 and the child seat 104.

Advantages of the child safety seat described herein include a support base having an extension part that is operable to adjust a leg room in accordance with the size of a child sitting on the child safety seat. Accordingly, the child safety seat can offer a comfortable sitting environment for an older child, which can encourage extended use of the child safety seat in the safer rear facing position.

Realizations of the child safety seat have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a child seat for receiving a child; and
   a support base for supporting the child seat, the child seat being detachably installable on the support base, wherein the support base includes:
   a shell body having an end;
   an extension part having a panel and disposed adjacent to the end of the shell body, the extension part being at least partially received in a cavity of the shell body having two opposite sidewalls, the child safety seat being positionable on a vehicle seat with the panel in contact with a seatback of the vehicle seat, the extension part being movable relative to the shell body between a first and a second position, the panel being adjacent to the end of the shell body in the first position and deployed away from the end of the shell body in the second position; and
   a latch mechanism operable to lock the extension part in at least the second position, wherein the latch mechanism includes two latches assembled with the extension part for transversal movement, the two latches respectively engaging with the two sidewalls to lock the extension part in the second position and disengaging from the two sidewalls for movement of the extension part between the first and second positions.

2. The child safety seat according to claim 1, wherein the extension part protrudes above a top of the shell body and is slidable relative to the shell body between the first position and the second position, the panel being deployed horizontally away from the end of the shell body in the second position.

3. The child safety seat according to claim 1, wherein the latch mechanism further includes an actuator operatively connected with the two latches and exposed for operation, the actuator being slidable relative to the extension part along a first axis, and the two latches being slidable relative to the extension part along a second axis substantially perpendicular to the first axis.

4. The child safety seat according to claim 3, wherein the actuator is exposed through an opening provided on the foremost end surface of the extension part.

5. The child safety seat according to claim 3, wherein the latch mechanism further includes a spring connected with the actuator, the spring applying a biasing force for urging the actuator away from the panel.

6. The child safety seat according to claim 3, wherein the latch mechanism further includes a linkage respectively connected with the two latches and the actuator.

7. The child safety seat according to claim 6, wherein the actuator, the linkage and the two latches are movable concurrently when the two latches move between a locking state engaged with the two sidewalls and an unlocking state disengaged from the two sidewalls.

8. The child safety seat according to claim 7, wherein the linkage includes a central portion connected with the actuator, and two diverging portions elastically deformable that are attached to the central portion, the two diverging portions further being respectively connected with the two latches at two sides of the central portion.

9. The child safety seat according to claim 8, wherein each of the two diverging portions has a curved shape.

10. The child safety seat according to claim 3, wherein the actuator has two ramp surfaces, and the two latches are respectively in sliding contact with the two ramp surfaces.

11. The child safety seat according to claim 10, wherein the latch mechanism further includes a spring oppositely connected with the two latches, the spring applying a biasing force for urging the two latches toward the locking state.

12. The child safety seat according to claim 1, wherein the support base further includes a recline foot connected with the shell body and disposed adjacent to the extension part, the recline foot being movable relative to the shell body to adjust an inclination of the support base.

13. The child safety seat according to claim 12, wherein the recline foot is movable relative to the shell body while the extension part remains stationary relative to the shell body.

14. The child safety seat according to claim 12, wherein the extension part and the recline foot move in unison while the recline foot moves relative to the shell body for adjusting the inclination of the support base.

15. A child safety seat comprising:
a child seat for receiving a child; and
a support base for supporting the child seat, the child seat being detachably installable on the support base, wherein the support base includes:
a shell body having an end and a bottom surface;
an extension part disposed adjacent to the end of the shell body and having a foremost end surface, the child safety seat being positionable on a vehicle seat with the foremost end surface in contact with a seatback of the vehicle seat, the extension part being movable relative to the shell body substantially parallel to the bottom surface between a first and a second position, the foremost end surface being adjacent to the end of the shell body in the first position and deployed away from the end of the shell body in the second position; and
a recline foot connected with the shell body and disposed adjacent to the extension part, the recline foot being movable relative to the shell body to adjust an inclination of the support base, wherein the recline foot has a bottom portion and two raised portions fixedly connected with the bottom portion, the recline foot being placed with the bottom portion extending across an underside of the extension part and the two raised portions disposed at a left and a right side of the extension part.

16. The child safety seat according to claim 15, wherein the extension part includes a panel and an insert portion fixedly connected with each other and is slidable relative to the shell body between the first position and the second position, the foremost end surface being defined on the panel, and the insert portion being received at least partially in the shell body, the foremost end surface being deployed horizontally away from the end of the shell body in the second position.

17. The child safety seat according to claim 15, wherein the recline foot is movable independently from the extension part for adjusting the inclination of the support base.

18. The child safety seat according to claim 15, wherein a gap is created between the extension part and the bottom portion of the recline foot when the recline foot is adjusted to protrude outward at a bottom of the shell body.

19. A child safety seat comprising:
a child seat for receiving a child; and
a support base for supporting the child seat, the child seat being detachably installable on the support base, wherein the support base includes:
a shell body having an end;
an extension part having a panel and disposed adjacent to the end of the shell body, the child safety seat being positionable on a vehicle seat with the panel in contact with a seatback of the vehicle seat, the extension part being movable relative to the shell body between a first and a second position, the panel being adjacent to the end of the shell body in the first position and deployed away from the end of the shell body in the second position;
a latch mechanism operable to lock the extension part in at least the second position; and
a recline foot connected with the shell body and disposed adjacent to the extension part, the recline foot being movable relative to the shell body to adjust an inclination of the support base, wherein the extension part and the recline foot move in unison while the recline foot moves relative to the shell body for adjusting the inclination of the support base.

* * * * *